United States Patent [19]

Brown et al.

[11] 4,345,727
[45] Aug. 24, 1982

[54] BODY-BRACED MAIN AIRPLANE LANDING GEAR

[75] Inventors: Robert B. Brown, Kent; John A. Stepien, Renton, both of Wash.

[73] Assignee: The Boeing Company, Seattle, Wash.

[21] Appl. No.: 107,137

[22] Filed: Dec. 26, 1979

[51] Int. Cl.³ .................................... B64C 25/12
[52] U.S. Cl. ................................... 244/102 R
[58] Field of Search ....... 244/102 R, 102 SS, 102 SL, 244/104 R, 104 FP, 100 R

[56] References Cited

U.S. PATENT DOCUMENTS

| | | | |
|---|---|---|---|
| 2,750,134 | 6/1956 | Hawkins | 244/102 R |
| 2,869,806 | 1/1959 | Beach | 244/102 R |
| 2,963,246 | 12/1960 | Mifrovich | 244/102 R |
| 3,372,892 | 3/1969 | May et al. | 244/102 R |
| 4,147,316 | 4/1979 | Kendal et al. | 244/102 R |
| 4,155,522 | 5/1979 | Sealey | 244/102 R |

FOREIGN PATENT DOCUMENTS

| | | | |
|---|---|---|---|
| 2225506 | 12/1972 | Fed. Rep. of Germany | 244/102 SL |
| 338611 | 3/1936 | Italy | 244/102 R |

*Primary Examiner*—Galen L. Barefoot
*Attorney, Agent, or Firm*—Christensen, O'Connor, Johnson & Kindness

[57] ABSTRACT

A body-braced main landing gear assembly for a commercial airplane includes a set of landing wheels journalled to a shock absorber strut. The shock strut and wheels are swingably attached to the underside of the wing structure by a trunion shaft for lateral as well as fore and aft swinging movement between an extended position wherein the wheels depend downwardly from the wing for taxiing and landing of the airplane and a retracted position wherein the wheels and shock strut are swung inwardly and upwardly into a wheel bay in the airplane fuselage. The shock strut is braced in the extended position by a foldable drag strut and a rigid radius brace. The foldable drag strut is attached at one end to the shock strut and is attached at its opposite end to the fuselage body at a point inward and forward of the trunion shaft. The radius brace is attached at one end to the shock strut and is attached at its opposite end to a point on the fuselage body inward and rearward of the trunion shaft. The body-braced main landing gear assembly permits the landing wheels to be positiond farther aft and farther outboard than normal, resulting in improved airplane ground stability and ground flotation and also in improved airplane aerodynamic performance during flight. The improvement in load path geometry enables a substantial reduction to be made in airplane wing and aft body weights.

6 Claims, 3 Drawing Figures

BODY-BRACED MAIN AIRPLANE LANDING GEAR

BACKGROUND OF THE INVENTION

The present invention relates generally to airplane landing gear assemblies, and more particularly to main landing gear assemblies for large commercial jet airplanes.

Large commercial jet airplanes typically include two main landing gear assemblies swingably attached to the undersides of the wings near the fuselage. Such landing gear assemblies are swung downwardly for taxiing and landing of the airplane and are retracted during flight by swinging them inwardly and upwardly into retracted positions wherein the landing wheels are stowed in wheel bays in the airplane fuselage.

Such landing gear assemblies are subject to several types of mechanical load during normal operations. When the airplane is stationary or slowly taxiing, the landing gear assemblies must be capable primarily of withstanding the static weight load of the airplane. During landing of the airplane, the main landing gear assemblies are additionally subjected to large, rearwardly directed drag loads as the airplane touches down on the runway and the brakes are applied. Also, the gear must withstand side loads which are generated during steering maneuvers. All of these various loading conditions are reacted by the gear components and, ultimately, by the gear support structures which attach the gear to the airplane. Ongoing developmental efforts have been directed toward providing a landing gear assembly and support structures that can accommodate both the static and dynamic loads with a minimum of size and weight.

A prime object of these efforts has been to alter and simplify the load path geometry of the gear so as to reduce loads in the individual gear components and to redirect loads from the gear to more substantial parts of the airplane, such as into the body, rather than into the wing spar or the landing gear support beam. It is also recognized that such a distribution of loads would permit some reduction to be made in the overall net weight of the airplane.

It has also been a major object of recent developmental efforts to increase the lateral distance (track width) between landing gear assemblies and also move the gear rearward on the airplane. Increasing the track width is desirable for the purpose of improving the stability of the airplane on the ground; however, its main purpose here is to improve the flotation characteristics of the airplane in order to meet certain weight load regulations being promulgated at LaGuardia Airport, New York.

Moving the landing gear assemblies further aft on the airplane is desirable for the purposes of accommodating a rearwardly displaced center of gravity and a low or up-balancing tail load. Moving the landing gear aft under such conditions results in increased lift and lowered drag for the airplane during flight. It also results in a possible weight reduction in the aft body of the airplane.

Previous proposals to increase the track width and also move the landing gear aft have proven unacceptable for several reasons. Briefly, such proposals have generally required increased gear and attendant complexity of mechanical attachments, have involved increased load path complexity and risk, and have required excessive angularity with respect to the vertical of the main oleo motion. Also, the previous proposals have been recognized as carrying an increased potential for wing fuel tank rupture in the event of landing gear collapse or have been based on unproven departures from accepted design practice.

Accordingly, it is an object of the present invention to provide a main landing gear assembly for a large commercial airplane wherein weight, side and drag loads on the main landing gear shock strut are distributed to fixed points on the fuselage body in addition to the points of attachment of the landing gear trunnion on the wing.

It is also an object of the present invention to provide a main landing gear assembly for a large commercial airplane that provides a greater track width and improved stability to the airplane, and wherein the landing wheels may be positioned further aft than has heretofore been possible.

It is another object of the present invention to enable a reduction to be made in the overall airplane weight by distributing loads on the landing gear to a greater number of fixed points on the fuselage body.

It is yet another object of the present invention to attain the foregoing objects using a minimum of additional mechanical components employed in accordance with proven design practices. Also, it is an object to provide a main landing gear assembly wherein the main shock strut and landing wheels swing in a controlled manner during retraction and extension such that the landing gear assembly may be reliably deployed in a free-fall extension during an emergency situation involving a power outage.

It is yet another object of the present invention to provide a landing gear assembly that is of decreased potential for wing fuel tank rupture in the event of a landing gear collapse.

SUMMARY OF THE INVENTION

In accordance with the present invention, a main landing gear assembly for a large commercial airplane includes a set of landing wheels journalled to a main shock strut swingably attached to the underside of an airplane wing. The shock strut and landing wheels are swingable between a downwardly extended, or taxiing position and a retracted position wherein the landing wheels and shock strut are swung upwardly and inwardly into a wheel bay in the airplane fuselage.

The shock strut is braced in the downwardly extended position by a rigid radius brace and a foldable drag strut. The radius brace is attached for universal pivotal motion to a fixed point on the airplane fuselage body at a point inward and rearward from the upper end of the main shock strut. The opposite end of the rigid radius brace is pivotably attached for universal pivotal motion to the main shock strut at its midsection.

The drag strut is foldable about its midsection. One end of the drag strut is pivotably attached for universal pivotal motion to a fixed point on the fuselage body forward and inward from the upper end of the main shock strut. The opposite end of the foldable drag strut is pivotably attached for universal pivotal motion to the midsection of the main shock strut.

The upper end of the main shock strut is pivotally suspended from a cross pin in a trunnion shaft that extends in a generally fore-and-aft direction. The trunnion shaft rotates on a pair of trunnion bearings at opposite ends of the trunnion shaft. The pivotal attachment of the main shock strut to the trunnion shaft operates as a Hooke universal joint. During retraction of the landing gear, the radius brace operates as a radius rod to constrain the main shock strut to swing forwardly, inwardly and upwardly in a positively controlled manner to its stowed position. Likewise, during extension of the landing gear assembly, the radius brace operates as a radius rod to cause the landing gear to swing downwardly, outwardly and slightly rearwardly to its landing position.

The drag strut and radius brace are attached to the fuselage body at points much farther forward and much farther aft, respectively, than have been used to support conventional landing gear assemblies. As a result, the drag load imposed on the main shock strut during landing and braking of the airplane is borne primarily by the drag strut and the radius brace, leaving primarily vertical loads to be borne by the trunnion bearings. Consequently, the main trunnion bearings and their associated mounting assemblies may be made smaller and lighter than has heretofore been possible. Although the landing gear of the present invention may be somewhat heavier than a conventional landing gear due to the relatively long radius brace and drag strut, a net reduction in the overall weight of the airplane is made possible by the distribution of the weight and drag loads to a greater number of fixed points on the fuselage body.

Also, because the drag loads imposed on the main shock strut during landing and braking of the airplane are borne primarily by the drag strut and the radius brace, there results a reduction of bending in the shock strut not possible in conventional gear assemblies.

DESCRIPTION OF THE PREFERRED EMBODIMENT

Figure 1:
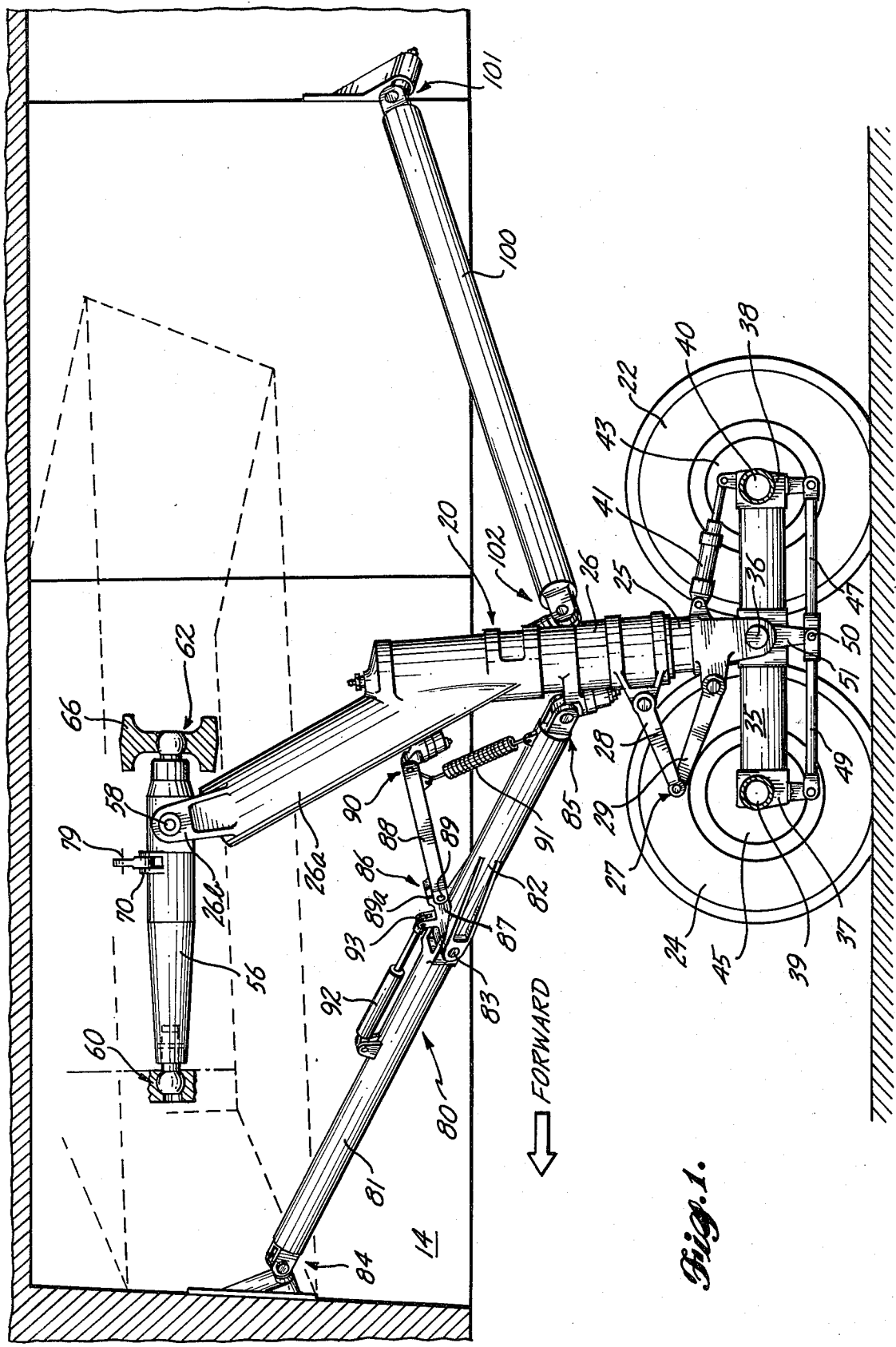
FIG. 1 is a side view in partial cross section of the preferred embodiment of a left-hand main landing gear assembly in a downwardly extended position.
Figure 2:
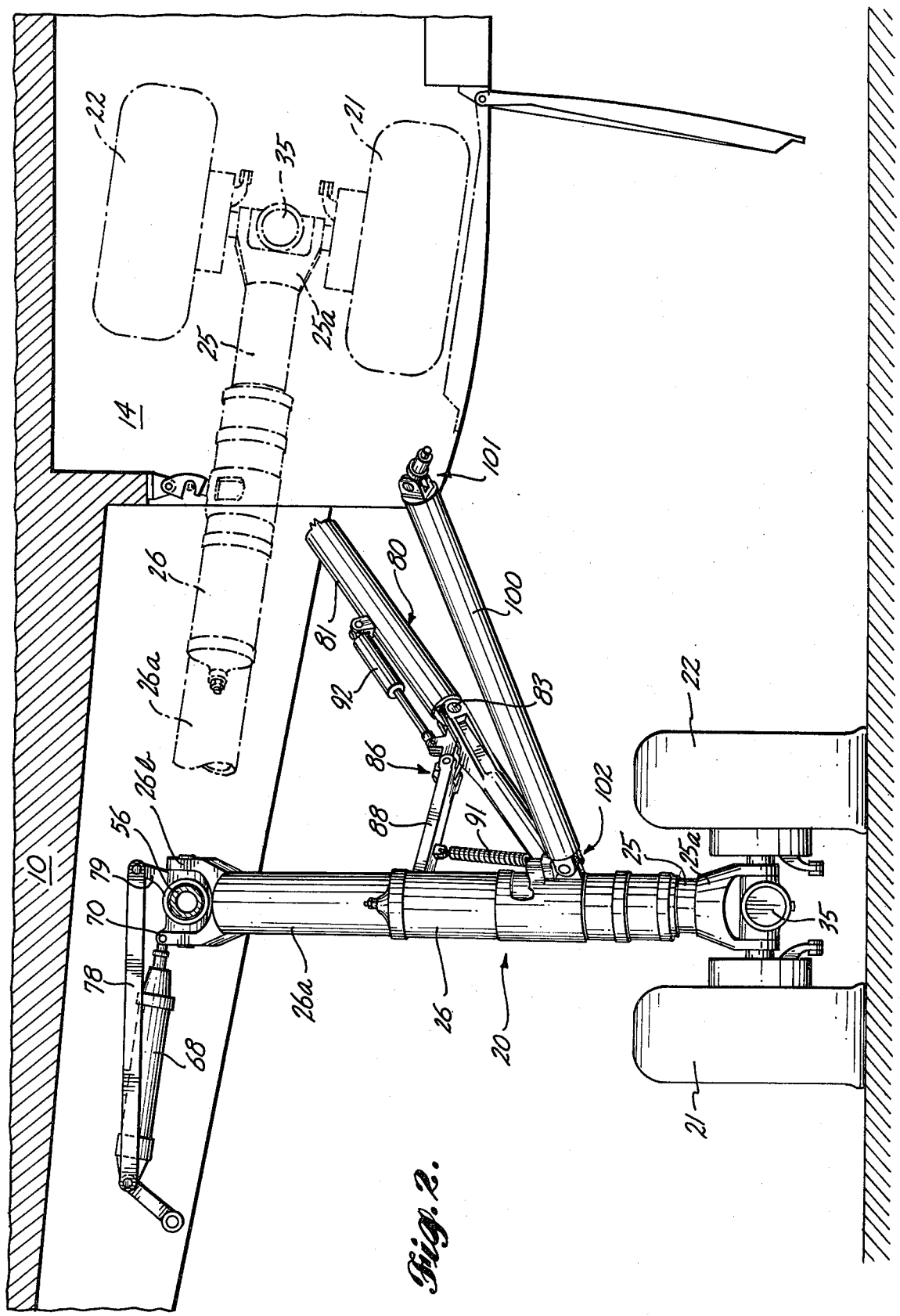
FIG. 2 is a rear view of the left-hand landing gear assembly of FIG. 1, with a phantom sketch showing the position of the landing gear assembly in its retracted position.
Figure 3:
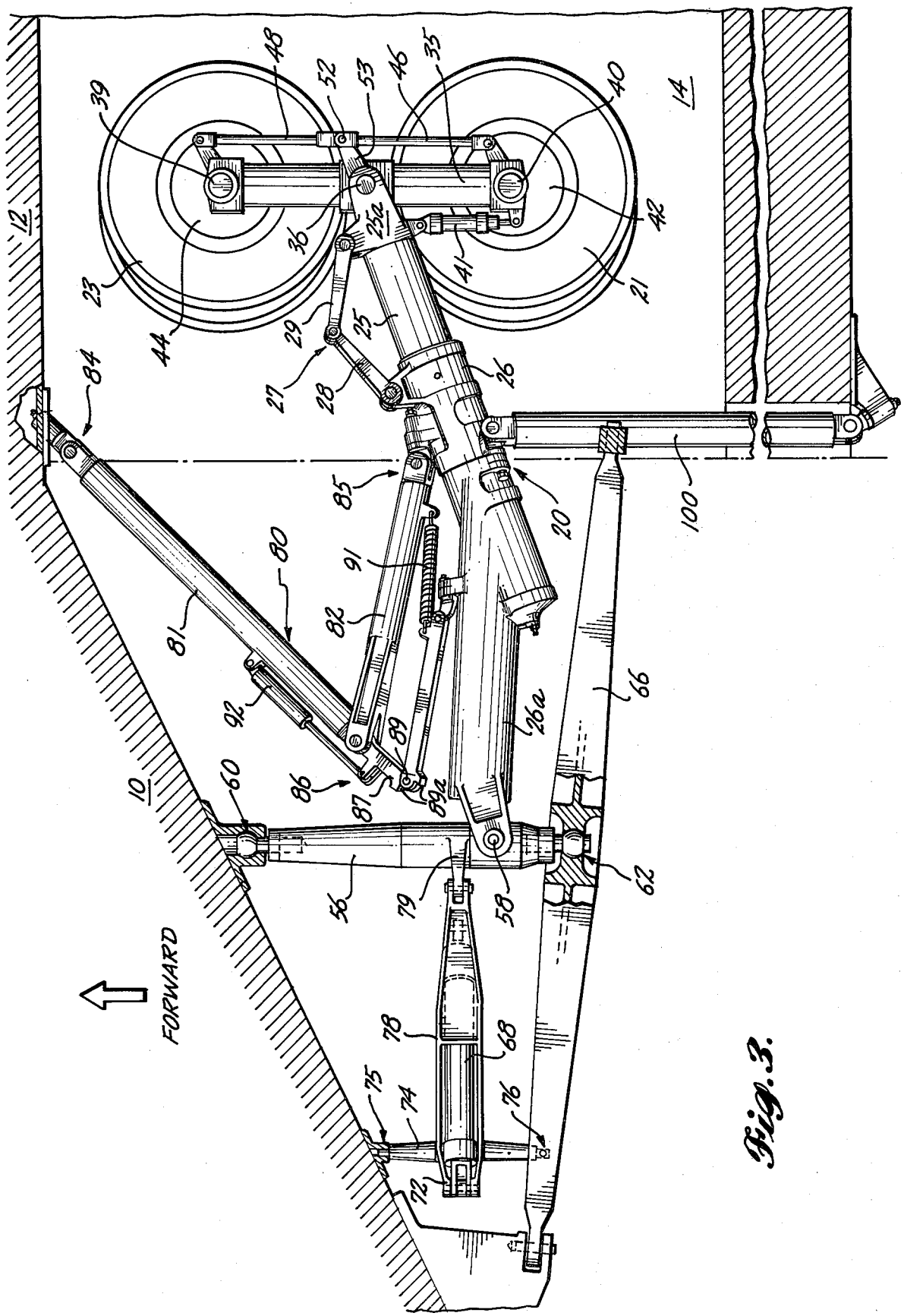
FIG. 3 is a plan view in partial cross section of the landing gear assembly of FIGS. 1 and 2 in the retracted position.

The referred embodiment of the present invention is illustrated and described herein by reference to a left-hand main landing gear assembly of a large commercial airplane. As illustrated in the accompanying FIGS. 1 through 3, the landing gear assembly is swingably mounted to the left-hand wing 10 of the airplane at a relatively greater distance from the airplane fuselage 12 than is possible with a conventional gear. FIGS. 1 and 2 show the landing gear assembly extending downwardly from the wing 10 as it is deployed during landing or taxiing of the airplane. FIG. 3 (also the phantom sketch in FIG. 2) shows the landing gear assembly swung inwardly and upwardly into a retracted position wherein the landing wheels are stowed in a wheel bay 14 of the airplane fuselage 12.

Referring in particular to FIGS. 1 and 2, the landing gear assembly includes a main shock absorber strut 20 swingably mounted to the airplane wing 10. A landing wheel truck having a set of four landing wheels 21, 22, 23 and 24 is journalled to the lower end of the main shock absorber strut 20. The main shock strut 20 includes telescoping inner and outer shock strut cylinders 25 and 26, respectively. The inner shock strut cylinder 25 is axially slidable within the outer cylinder 26 and protrudes from the lower end thereof. A shock absorber mechanism (not shown) is included inside the telescoping inner and outer cylinders 25 and 26. Rotation of the inner cylinder 25 with respect to the outer cylinder 26 is prevented by a torsion link assembly 27. The torsion link assembly 27 includes upper and lower torsion link arms 28 and 29, respectively, swingably connected to the outer shock strut cylinder 26 and the inner shock strut cylinder 25, respectively, for swinging movement in a plane parallel to the axis of the shock strut 20. The upper and lower torsion link arms 28 and 29 are further swingably connected to one another at their ends opposite the shock strut cylinders 26 and 25 to thereby prevent rotation of the inner cylinder 25 with respect to the outer cylinder 26 without restricting axial motion of the inner cylinder 25 within the outer cylinder 26. The four landing wheels 21 through 24 are journalled to a truck beam 35, which is pivotably connected to a bifurcated yoke 25a on the lower end of the inner shock strut cylinder 25 by a truck pivot pin 36. The axis of the truck pivot pin extends transversely with respect to the axis of the airplane fuselage 12 to thereby maintain the truck beam 35 positioned parallel to the direction of travel of the airplane on landing and also permit the truck beam 35 to be rotated slightly about the truck pivot pin 36 to position the landing wheels 21 through 25 in a horizontal orientation for landing.

At the fore and aft ends of the truck beam 35 are axle housings 37 and 38 through which pass the wheel axles 39 and 40, respectively. A hydraulic push-pull actuator 41 connects the aft end of the truck beam 35 to the inner shock strut cylinder 25 to enable positive positioning of the truck beam 35 after takeoff to ensure safe retraction of the gear and to keep the wheels clear of adjacent wheelwell structures and equipment during flight.

Each wheel 21 through 24 is equipped with a hydraulically actuated brake assembly. The brake assemblies includes brake plates 42, 43, 44 and 45 and associated brake rods 46, 47, 48 and 49, respectively. The two inside brake rods 47 and 49 are pivotably attached to the lower peripheral edges of the brake plates 43 and 45 of inside wheels 22 and 24, respectively, and are pivotably connected at their opposite ends to a common pivot pin 50 at the end of an inside brake lever 51 extending downwardly from the inner shock strut cylinder 25. Likewise, the two outer brake rods 46 and 48 are pivotably attached to the lower peripheral edges of the outer brake plates 42 and 44 and are pivotably connected at their opposite ends to a common pivot pin 52 at the end of a brake lever 53. The brake levers 51 and 53 each depend downwardly from the inner shock strut cylinder 25 to complete a fully compensated brake system in which torque generated by the brakes is transmitted to the shock strut 20 rather than to the truck beam 35.

The outer shock strut cylinder 26 includes a forwardly disposed dogleg portion 26a at its upper end, best illustrated in FIG. 1. The upper end of the dogleg portion 26a terminates in an integral, bifurcated yoke 26b that is pivotably attached to a trunnion shaft 56 by a transverse pivot pin 58. The trunnion shaft 56 is journalled at its opposite ends in forward and rear spherical trunnion bearing assemblies 60 and 62, respectively. The forward trunnion bearing assembly 60 is mounted to the rear wing spar 64. The rear trunnion bearing assembly 62 is mounted to a landing gear support beam 66 extending between the body frame and an outboard position on the rear wing spar 64.

Retraction and extension of the landing gear assembly is accomplished by operation of a linear hydraulic push-pull actuator 68. The actuator 68 is pivotably connected at one end to a bracket 70 extending transversely from the trunnion shaft 56. The opposite end of the actuator 68 is pivotably connected by a pivot pin 71 to an extension arm 72 extending transversely from a shaft 74. The shaft 74 is journalled at its opposite ends in bearing assemblies 75 and 76 mounted to the rear wing spar 64 and the landing gear beam 66, respectively. A bifurcated arm 78 is pivotably attached at one end to an arm 79 extending transversely from the trunnion shaft 56. The bifurcated arm 78 is pivotably attached at its opposite end to the common pivot pin 71 connecting the extension arm 72 to the actuator 68. Linear expansion of the actuator 68 causes retraction of the landing gear assembly by swinging it into the position shown in phantom FIG. 2.

The main shock strut 20 is rigidly braced in the downwardly extended taxiing position by a foldable drag strut 80 and a rigid radius brace 100. The drag strut 80 is connected to the outer shock strut cylinder 26 at a fixed point along the length of the outer cylinder 26 and extends therefrom at an angle upwardly, inwardly and forwardly from the shock strut 20 to a fixed point on the fuselage frame of the airplane. The radius brace 100 extends from a fixed point on the outer shock strut cylinder 26 upwardly, inwardly and rearwardly to a fixed point on the fuselage frame.

The foldable drag strut 80 includes first and second rigid strut arms 81 and 82, respectively, pivotably connected for folding motion by a pivot pin 83. The end of the first strut arm 81 opposite the pivot pin 83 is attached to the primary frame of the airplane fuselage at a point below the root of the rear wing spar 64 by a universal pivot joint assembly 84. The universal pivot joint 84 includes first and second pivot pins disposed at right angles with respect to one another to provide for universal pivotal motion of the strut arm 81 with respect to the fuselage frame. The end of the second strut arm 82 opposite the pivot pin 83 is likewise pivotably connected to the outer shock strut cylinder 26 by a universal pivot joint assembly 85. The pivot joint assembly 85 also includes two crossed pivot pins to provide for universal pivotal motion of the strut arm 82 with respect to the outer shock strut cylinder 26.

The foldable drag strut 80 further includes an over-center, locking jury strut 86 that operates to lock the drag strut arms 81 and 82 in rigid alignment when the landing gear is extended downwardly. The jury strut 86 includes first and second jury strut arms 87 and 88, respectively, pivotably connected for folding motion by a pivot pin 89. Jury strut arm 87 is pivotably connected to the connected ends of drag strut arms 81 and 82 by the common pivot pin 83. The opposite end of the second jury strut arm 88 is attached to the outer shock strut cylinder 26 by a universal pivot joint assembly 90. The universal pivot joint assembly 90 includes cross pivot pins to provide for universal pivotal motion of the jury strut arm 88 with respect to the outer shock strut cylinder 26.

The locking jury strut 86 is held in rigid alignment when the landing gear is extended by a coil spring 91. The coil spring 91 is connected at one end to the jury strut arm 88 and is connected at its opposite end to the drag strut arm 82 adjacent the universal pivot joint assembly 85. The jury strut arms 87 and 88 are foldable with respect to one another in one direction only by virtue of an over-center abutment 89a, such that the jury strut 86 is maintained in a rigid, aligned orientation by the tensile force exerted by the spring 91 upon the jury strut arm 88. A linear hydraulic delocking actuator 92 is operable to selectively unlock the aligned arms 87 and 88 of the jury strut 86 in preparation for retraction of the landing gear. The delocking actuator 92 is pivotably connected at one end to a bracket at an intermediate point on the drag strut arm 81 and is pivotably connected at its opposite end to a short extension arm 93 extending transversely from the jury strut arm 87. In operation, the delocking actuator 92 is actuated to pull on the extension arm 93 to thereby break the alignment of both the jury strut arms 87 and 88 as well as the drag strut arms 81 and 82 to thereby allow the landing gear to be retracted in the manner described above.

The radius brace 100 is pivotably connected at one end to the main fuselage frame of the airplane by a universal pivot joint assembly 101. The pivot joint assembly 101 is similar to the pivot joint assembly 84 and includes a pair of pivot pins disposed at right angles to one another to provide for universal pivotal motion of the radius brace 100 with respect to the body frame of the airplane. The opposite end of the radius brace 100 is pivotably connected to the outer shock strut cylinder 26 by a universal pivot joint assembly 102. The universal pivot joint assembly 102 is positioned on the outer shock strut cylinder adjacent the universal joint assembly 85 and is similarly constructed.

In operation, the drag strut 80 and the radius brace 100 operate to route a portion of the drag load imposed on the main shock strut 20 during landing, braking and turning of the airplane into the body rather than into the wing spar 64 and landing gear support beam 66. The result is a reduction of the vertical (but not the side or drag) loads in the trunnion bearings and the bending loads in the shock absorber strut 20 relative to conventional landing gear assemblies. This is contrary to the load distribution of conventional landing gear assemblies, wherein the landing gear, particularly the main shock strut, is highly loaded, and wherein the vertical load in the aft trunnion shaft bearing assemblies is also very high.

Attachment of the drag strut 80 and radius brace 100 to the body allows location of the gear further outboard with less penalty than is possible with a conventional gear, which would suffer from very high vertical loads in the aft trunnion bearing 62. As a result, the track width is greater and meets the requirements of LaGuardia Airport, New York. Also, since the trunnion shaft 56 is also moved further aft by being positioned further outboard on the rear wing spar 64, the landing assemblies are positioned further aft on the airplane than has heretofore been possible. Consequently, the airplane is better equipped to handle aft weight loads.

The radius brace 100 operates as a radius rod during retraction and extension of the landing gear assembly, thereby providing positive control of the motion of the gear throughout its deployment. During retraction, the radius brace 100 constrains the main shock strut 20 to swing slightly forwardly about the trunnion shaft pivot pin 58 in a skewed travel path as the landing gear is swung inwardly and upwardly about the trunnion shaft 56. Accordingly, the wheels are stowed in a position slightly forwardly with respect to their positions in extension. Likewise, during extension of the landing gear the radius brace 100 constrains the shock strut 20 and wheels to swing slightly aft as they are swung downwardly and outwardly out of the wheel well of the airplane.

Although the present invention is described and illustrated herein by reference to a preferred embodiment, it will be understood that various modifications, alterations and substitutions that may be apparent to one skilled in the art may be made without departing from the essential spirit of the invention. Accordingly, the scope of the present invention is defined by the following claims.

The embodiments of the invention in which an exclusive property or privilege is claimed are defined as follows.

1. A main landing gear assembly for an airplane having a fuselage boy and a wing, comprising:
   a shock strut having a first end and a second end and wheel means journalled to said second end of said shock strut, said first end of said shock strut being pivotably and universally attached to said wing of said airplane for universal pivotal movement of said shock strut and said wheel means between a downwardly depending, extended position for taxiing and landing of said airplane and a retracted position;
   a foldable drag strut having first and second ends, said first end of said drag strut being pivotably and universally attached to said shock strut at a first position on said shock strut intermediate said first and second ends of said shock strut, said second end of said drag strut being pivotably and universally attached to a first fixed point of said fuselage body, said first fixed point of said fuselage body being inward and forward of said first end of said shock strut, and releasable locking means for maintaining said drag strut in a nonfolded, aligned configuration with said shock strut in said extended position; and,
   a rigid radius brace having first and second ends, said first end of said radius brace being pivotably and universally connected to said shock strut at a second position on said shock strut intermediate said first and second ends of said shock strut, said second end of said radius brace being pivotably and universally connected to a second fixed point of said fuselage body, said second fixed point of said fuselage body being inward and rearward of said first end of said shock strut such that said rigid radius brace constrains said shock strut to extend and retract along a predetermined skewed travel path in an inward, upward and forward movement during retraction and a corresponding outward, downward and rearward movement during extension, and whereby said rigid radius brace and said foldable drag strut operate to bear a major portion of drag loads imposed on the extended landing gear assembly.

2. The landing gear assembly defined in claim 1 wherein said first end of said shock strut is attached to the underside of said wing of said airplane by means of a trunnion shaft extending generally parallel to the axis of said airplane fuselage body and journalled in fore and aft trunnion bearing assemblies, said first end of said shock strut terminating in a bifurcated yoke pivotably attached to said trunnion shaft for swinging motion of said shock strut relative to said trunnion shaft in a plane parallel to the axis of said trunnion shaft.

3. The landing gear assembly defined in claim 2 wherein said foldable drag strut comprises first and second rigid drag strut arms swingably connected by a pivot pin, said first drag strut arm being pivotably connected to said shock strut at said first position and said second drag strut arm being attached to said first fixed point of said fuselage body.

4. The landing gear assembly defined in claim 3 wherein said releasable locking means comprises an over-center locking jury strut, said jury strut being pivotably connected at one end to said drag strut by said pivot pin swingably connecting said drag strut arms, said jury strut being pivotably connected at its opposite end to said shock strut at a point along said shock strut intermediate between said first end of said shock strut and said first position on said shock strut.

5. The landing gear assembly defined in claim 4 wherein said over-center locking jury strut includes an hydraulic delocking actuator and a locking spring assembly.

6. The landing gear assembly defined in claim 5 wherein said forward trunnion bearing assembly is mounted to a rear wing spar of said wing and wherein said rear trunnion bearing assembly is mounted to a landing gear support beam.

* * * * *